United States Patent Office 3,443,341
Patented May 13, 1969

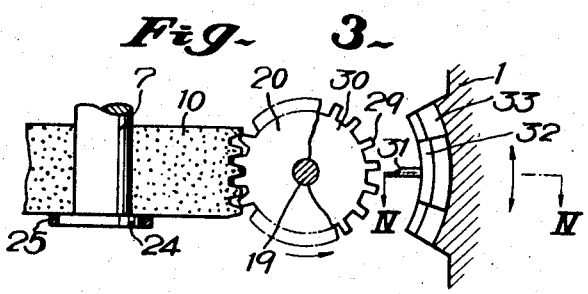
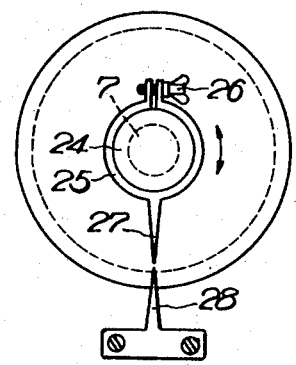
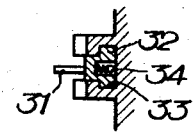
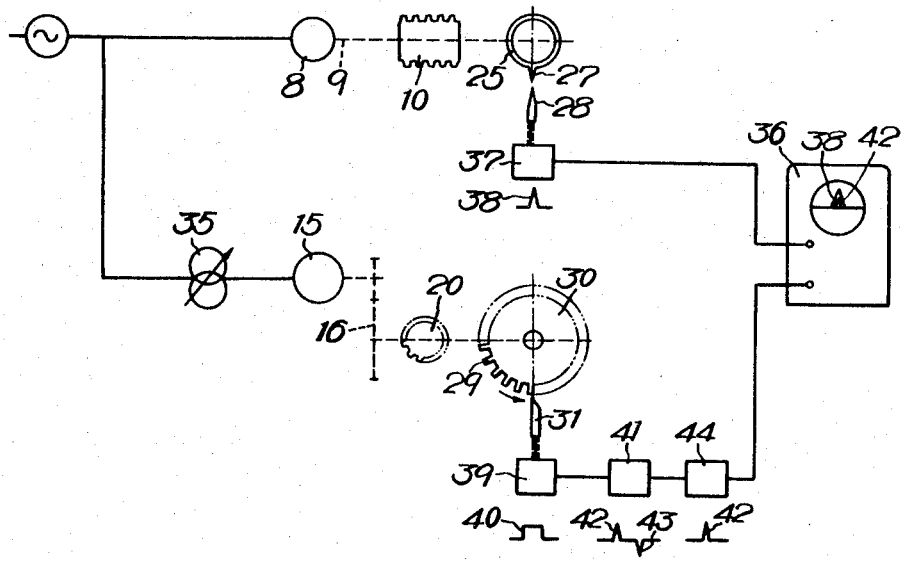

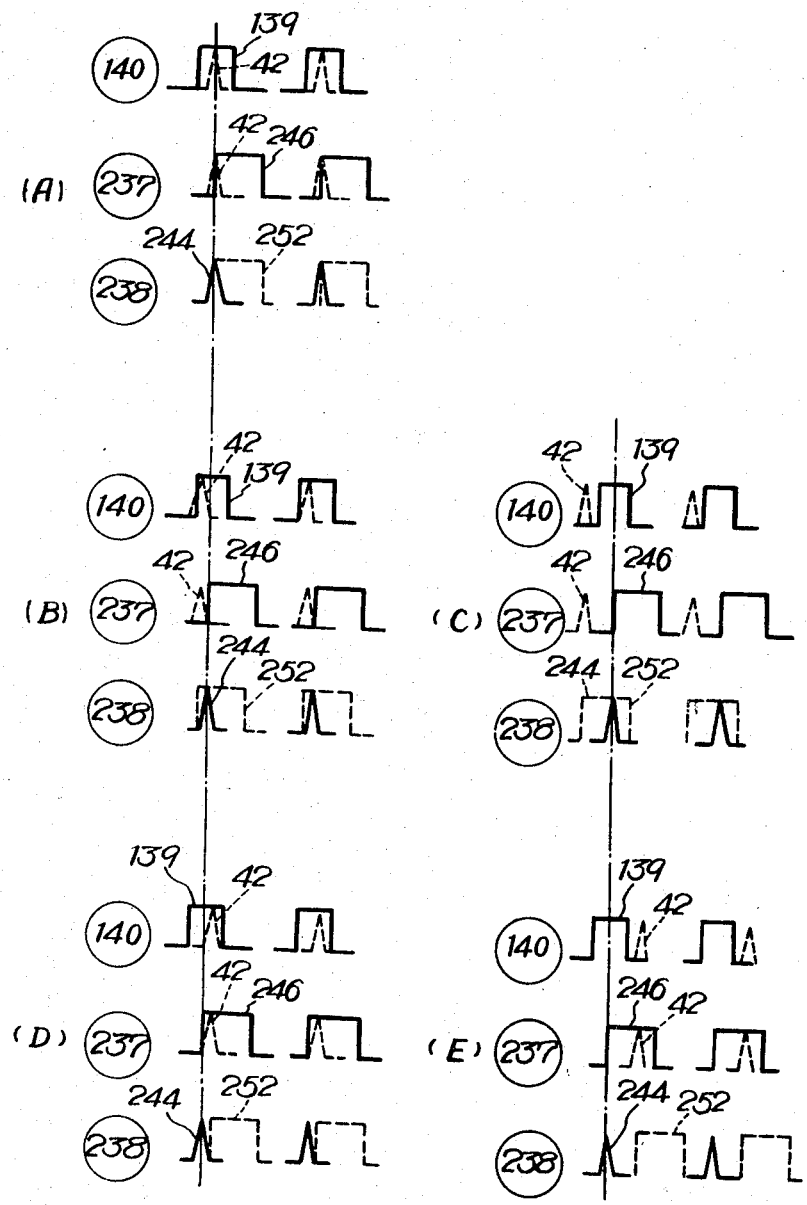

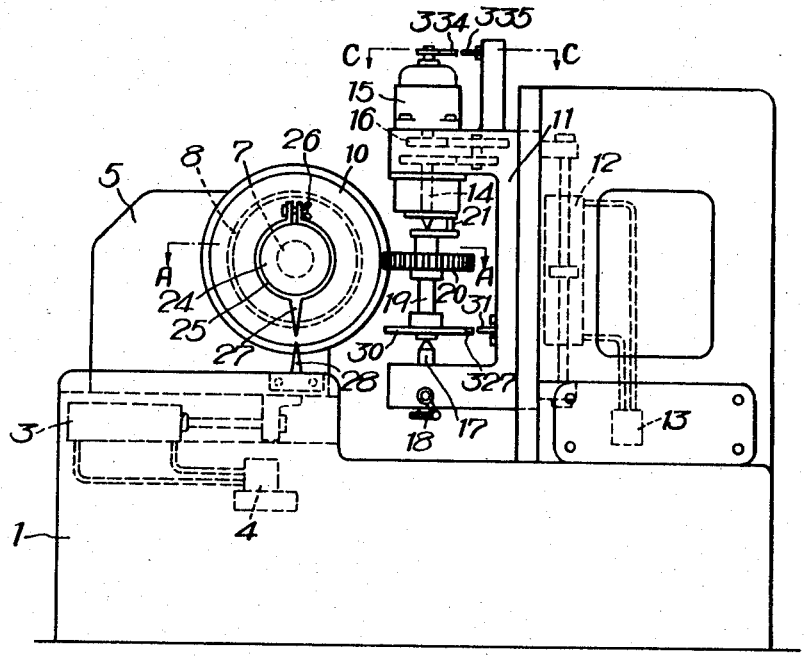
Fig- 10-
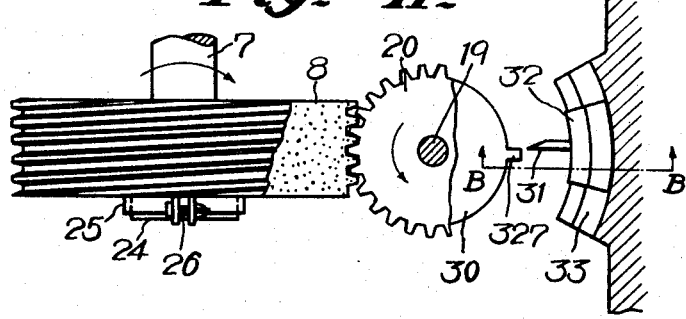
Fig- 11-
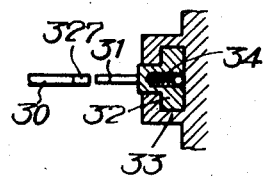
Fig- 12-

3,443,341
GEAR GRINDING MACHINE
Soichiro Honda and Shiro Uchida, Tokyo, Japan, assignors to Honda Giken Kogyo Kabushiki Kaisha, Tokyo, Japan
Filed Apr. 20, 1964, Ser. No. 361,092
Claims priority, application Japan, Aug. 30, 1963, 38/45,455; Sept. 11, 1963, 38/47,943; Oct. 23, 1963, 38/56,076; Dec. 17, 1963, 38/67,593
Int. Cl. B24b 27/00, 3/34
U.S. Cl. 51—105                5 Claims This invention relates generally to gear grinding machines and particularly to those of the type employing a hob-type helical abrasive wheel rotatable in synchronism with a roughly shaped gear stock to grind the latter.

The present invention has for its object to provide a gear grinding machine of the type described which has no backlash in the drive and other mechanisms and capable of grinding gear stock with ease and accuracy.

According to one aspect of the present invention, there is provided a gear grinding machine of the type described which comprises memory means for registering definite angular positions of the abrasive wheel and the gear stock rotating in synchronism with each other, means for adjusting the phase relationship between the abrasive wheel and gear stock in their synchronized rotation, and in-phase detector means for detecting the in-phase relation between the rotating abrasive wheel and gear stock.

According to a second aspect of the present invention, there is provided a gear grinding machine of the character described in which said phase adjuster means and said in-phase detector means are both made automatically operable and which further comprises automatic feed means automatically operable by said automatic in-phase detector means to feed the abrasive wheel into gear stock.

According to a third aspect of the present invention, there is provided a gear grinding machine of the character described in which said phase adjuster means and said in-phase detector means are both made automatically operable and which further comprises driving control means automatically operable through the intermediary of said in-phase detector means to drive in opposite directions and stop said phase adjuster means depending upon the phase relationship between the rotating abrasive wheel and gear stock at the instant when they pass their respective angular positions as memorized in said memory means so that a predetermined phase relationship is maintained between said abrasive wheel and gear stock in operation with extreme accuracy. According to the fourth aspect of the invention, means for automatically feeding the abrasive wheel into gear stock is added.

A further aspect of the present invention lies in the provision of further memory means arranged on the rotor shaft of the stock driving motor to register a definite angular position of the rotor shaft as an indication of a corresponding definite angular position of the gear stock mandrel about its axis of rotation, the first-mentioned memory means including a memory plate having a single memory lug formed on the periphery thereof and mounted on the gear stock mandrel, and loader means for loading the latter.

The above and other objects, features and advantages of the invention will become apparent from the following detailed description when taken in conjunction with the accompanying drawings, which illustrate a few embodiments of the present invention and in which:

FIG. 3 is an enlarged fragmentary plan view showing the relationship between the abrasive wheel and gear stock and also showing the memory means for registering an angular position of the stock;

FIG. 4 is a fragmentary cross section taken along the line IV—IV in FIG. 3;

FIG. 5 is an enlarged front elevation of the memory means for registering an angular position of the abrasive wheel;

FIG. 6 is a schematic diagram illustrating the first aspect of the present invention;

Figure 8:
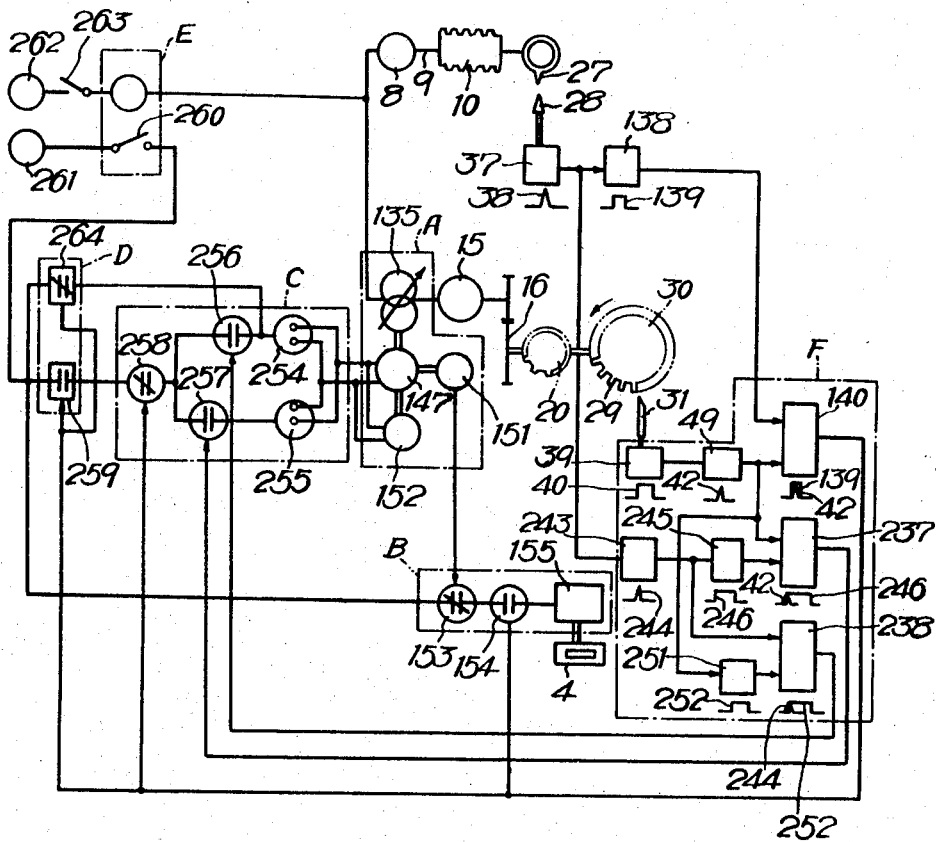
FIG. 8 is a schematic diagram illustrating the third and fourth aspect of the present invention.
Figure 13:
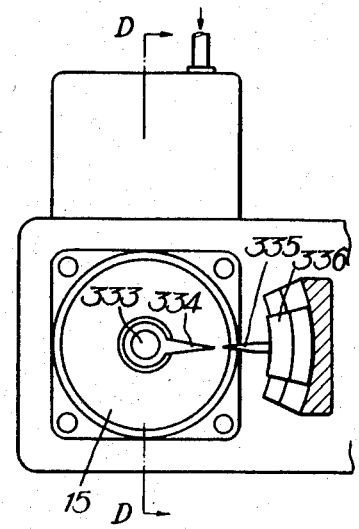
Figure 14:
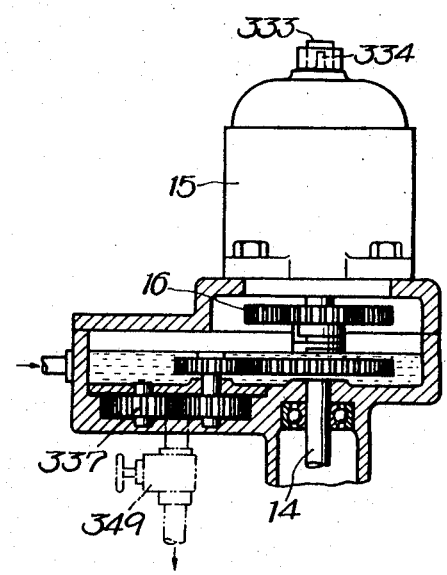

FIG. 9 diagrammatically illustrates the operation of the control device in FIG. 8; and FIGS. 10 to 15 illustrate a further aspect of the present invention;

FIG. 10 representing a front elevation of the entire apparatus;

FIG. 11 representing an enlarged cross section taken along the line A—A in FIG. 10;

FIG. 12 representing a cross section taken along the line B—B in FIG. 11;

FIG. 13 representing an enlarged cross section taken along the line C—C in FIG. 10;

FIG. 14 representing a cross section taken along the line D—D in FIG. 13; and

Figure 15:
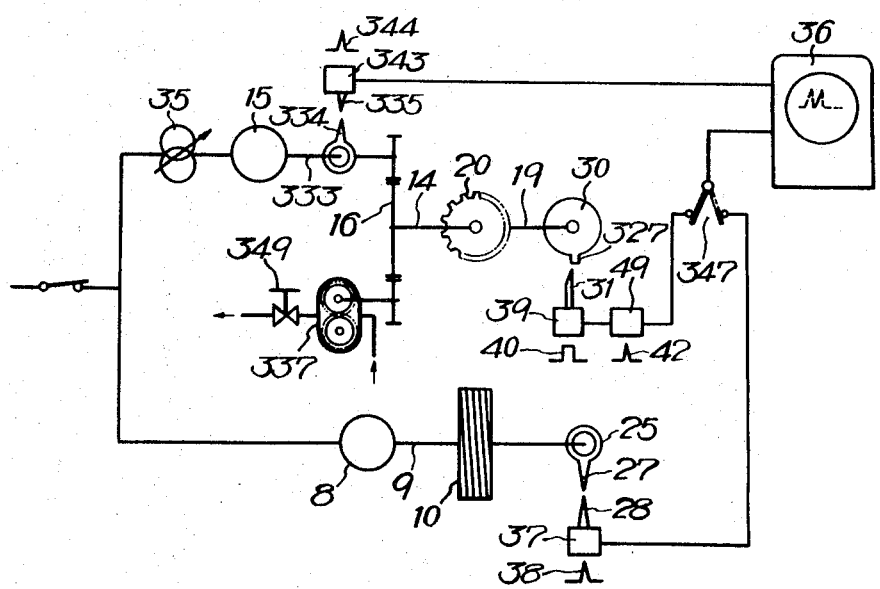

FIG. 15 schematically illustrating the fifth aspect of the present invention shown in FIGS. 10 to 14.

Figure 1:
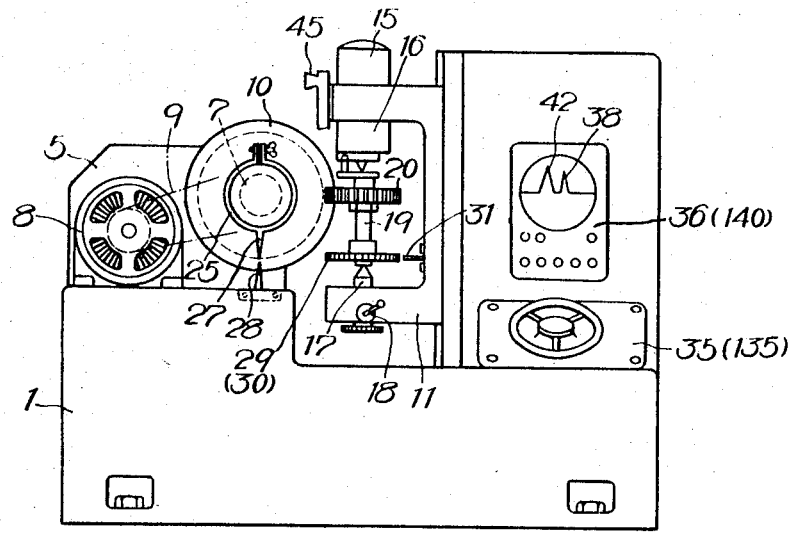
FIG. 1 is a front elevation of one embodiment of the invention.
Figure 2:
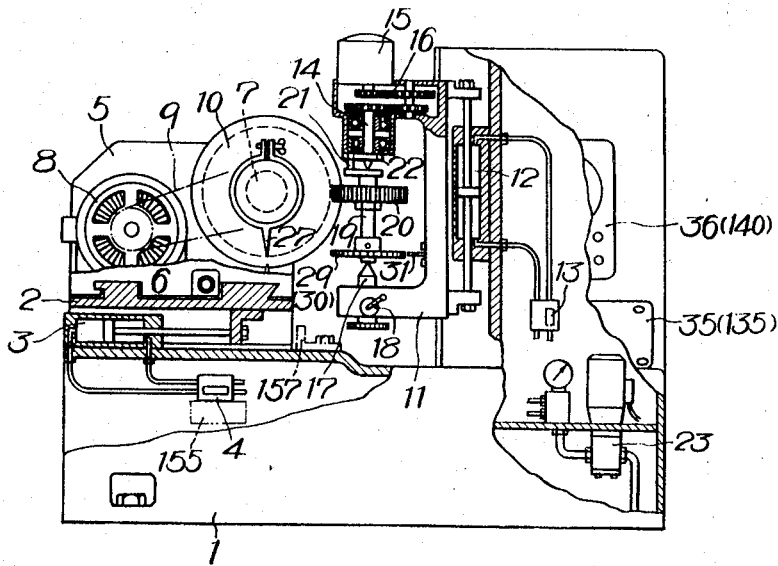
FIG. 2 is a view similar to FIG. 1 with parts broken away to show the interior mechanisms of the machine of FIG. 1.

Referring to the drawings and first to FIGS. 1 and 2, the gear grinding machine includes a horizontal slide table 2 mounted on the machine frame 1 for feed motion under control of an oil hydraulic mechanism 3 with a switching device 4. A tool carriage 5 is mounted on the slide table 2 for sliding movement therealong in a direction at right angles to the direction in which the slide table 2 slides in its feed motion. As will be observed, the traversing or sliding movement of the tool carriage is effected by way of a feed screw 6. A tool spindle 7 is journaled on the tool carriage 5, on which is also mounted a synchronous motor 8, which drives the tool spindle 7 by means of a transmission 9. As shown, a hob-type helical abrasive wheel 10 is mounted fast on the tool spindle 7.

Also, mounted on the machine frame 1 is a vertical slide 11, which is vertically operable by an oil hydraulic mechanism 12 with a switching device 13. On the top portion of the slide 11 is journaled a main or stock spindle 14, which is driven from a synchronous motor 15 mounted on the slide 11 by way of speed reduction gear 16. A bearing rod or center 17 is mounted vertically adjustably on the bottom of the slide 11 with a clamp lever 18 provided to fix the center 17 in its adjusted position. A mandrel 19, on which a gear stock 20 is detachably mounted, is supported at opposite ends by the main spindle 14 and center 17. As illustrated, the main spindle 14 carries a face plate 22, in which is fitted an engaging pin 21 formed on the mandrel 19 and having an axis in parallel with and offset from the axis thereof. An oil pressure pump 23 is provided to operate oil hydraulic mechanisms 3 and 12.

With the above arrangement, it will be understood that, upon rotation of synchronous motors 8 and 15, hob-type helical abrasive tool or wheel 10 and gear stock 20 are rotated in a definite speed ratio depending upon the lead of the helix of tool 10 and the number of teeth on the gear stock 20.

Referring next to FIGS. 3, 4 and 5, the memory means for registering angular positions of tool spindle 7 and mandrel 19 about their respective axes will be described.

Tool spindle 7 is formed with an integral end plate 24, over which a ring 25 is rotatably fitted and held in place on the end plate 24 by a clamp screw 26, as clearly shown in FIG. 5. A memory pointer 27 extends from the ring 25 for cooperation with another memory pointer 28, which is secured to the tool carriage 5. Secured to the stock carrying mandrel 19 is a memory plate 30 formed about its periphery with memory lugs 29 in the same number as that of the teeth on stock 20 or a fraction thereof. Cooperating with the memory lugs 29 is a memory pointer 31 carried on a slide block 32, which is slidably fitted in a guide groove 33 formed in the adjacent portion of the machine frame 1. As shown, the guide groove 33 is arcuate about the axis of the mandrel 19. A friction enhancing device including a spring-loaded ball 34 is provided to prevent inadvertent motion of the slide block 32 (see FIG. 4). It will be noted that upon operation of synchronous motors 8 and 15 the memory plate 30 rotates through an angle corresponding to the pitch of its memory lugs while the tool 10 makes one or more complete revolutions. While the abrasive wheel 10 and gear stock 20 are at rest, they are positioned relative to each other so that the helical formation on the former is placed in accurate meshing engagement with the lug formation on the stock 20, as shown in FIG. 3, and subsequently the memory pointer 27 on the tool spindle is manually placed in alignment with the cooperating memory pointer 28 and then fixed to the tool spindle 7. Similarly, the slide block 32 with memory pointer 31 is manually adjusted in the guide groove 33 so that the pointer 31 is placed in alignment with any one of the memory lugs 29 on the plate 30. In this manner, it will be noted that the angular positions of the tool 10 and stock 20 establishing an appropriate intermeshing relationship therebetween are registered in the memory means including memory pointers 27, 28, memory plate 30 and memory pointer 31. After the completion of the above registering procedure, the tool 10 is retracted out of meshing engagement with stock 20, but the proper intermeshing relationship therebetween can be maintained as long as both the two memory devices 27–28 observably and 30–31 remain in their respective aligned positions. This holds even when the tool 10 and stock 20 are rotating, as will readily be understood.

The first aspect of the present invention lies in the provision of the above-described memory means for registering definite angular positions of the tool 10 and stock 20 about their respective axes of rotation, phase angle detector means for detecting the arrival of said memory means in the respective registering positions during rotation of the tool 10 and stock 20, and adjuster means for adjusting the phase relationship between the tool and the stock in their synchronized rotation. The phase adjuster means may conveniently take the form of a conventional phase shifter for synchronous motors. Reference numeral 35 in FIG. 1 indicates such phase shifter affixed to the machine frame 1. The phase angle detector means may also take any desired form, but it is convenient to employ a two-phenomenon synchroscope, as indicated at 36 in FIG. 1.

Next, the phase angle detector means will be described briefly only to such an extent as required for the understanding of the invention.

Referring to FIG. 6, memory device 27–28 for registration of the tool position is connected to the input terminal of a frequency-modulation capacitive displacement pickup 37, the output terminal of which is connected to the input side of the two-phenomenon synchroscope 36. It will be understood that, when memory pointers 27 and 28 are placed in alignment with each other, a sharp sensible pulse 38 is generated by the capacitive displacement pickup 37 and a corresponding waveform appears on the two-phenomenon synchroscope 36. It is to be noted at this point that, if the memory lugs 29 and pointer 31 cooperating to register the stock position were made as sharp as the memory pointers 27 and 28 for tool position registration, any sharp or clearly defined pulse could hardly be formed and the waveform appearing on the synchroscope would thus have only quite an indefinite peak since the memory lugs 29 have only an extremely small linear velocity relative to that of memory pointer 27. To overcome this difficulty, the memory lugs 29 are shaped rectangular while the memory pointer 31 is formed with a beveled end having a straight side, as clearly seen in FIG. 3. The memory device including memory lugs 29 and pointer 31 of such configurations is connected to the input side of another frequency-modulation capacitive displacement pickup 39, which produces a square or rectangular wave 40, which is fed into a differentiation circuit 41 and transformed therein into a pair of sharp rising and falling pulses 42 and 43. The pulses 42 and 43 have their respective peak values at the front and rear ends of the corresponding rectangular wave 40. The sharp pulses 42 and 43 enter a rectifier circuit 44, by means of which the lower sharp pulse 43 is eliminated, the upper one 42 proceeding to produce a corresponding sharp waveform on the two-phenomenon synchroscope 36.

Description will now be made on the manner in which the above-described gear-grinding machine is operated in use.

First, as already described, memory pointers 27 and 31 are fixed in their proper respective registering positions while the abrasive wheel 10 and gear stock 20 are held at rest in an accurate meshing relationship with each other. Incidentally, in order to facilitate relative rotation of tool 10 and stock 20, a clutch may preferably be arranged between the tool spindle 7 or the mandrel 19 and the associated synchronous motor. Also, it may be desirable to employ a microscopic device or the like, as indicated at 45 in FIG. 1, in order to ensure accurate meshing engagement between the tool 10 and stock 20. After completion of the registering operation, tool 10 is retracted out of engagement with stock 20 and the clutch, if used, is engaged.

Subsequently, synchronous motors 8 and 15 are energized. Initially, there is a phase difference between the waveforms 38 and 42 appearing on the two-phenomenon synchroscope 36 because of various factors including the backlash in the transmission 9 and reduction gear 16 and the coupling error of the clutch used. To eliminate such phase difference, phase adjuster 35 is manually operated to place the waveforms 38 and 42 in coincidence with each other thereby to ensure that tool 10 and stock 20 rotate while maintaining the normal intermeshing phase relationship therebetween. Subsequently, by feeding tool 10 into stock 20, the latter now rotating in proper phase relation with the former can be ground accurately.

As described above, according to the present aspect of the invention, the angular positions of tool 10 and stock 20 are registered while they are at rest in an intermeshing relationship with each other and any error in phase inevitably occurring between the tool and stock in their initial idle rotation is detected and eliminated before grinding operation is actually started. It will be appreciated, therefore, that no grinding is actually effected during the initial operation of the machine before the proper phase relationship is established between the tool and stock and thus throughout the effective grinding operation they are maintained in such proper phase relationship. This enables efficient and accurate grinding operation and is highly advantageous from the standpoint of production.

The second aspect of the present invention is designed to automatically place the tool 10 and stock 20 in intermeshing engagement when they have been placed in phase during their initial idle rotation. To this end, the phase adjuster means and in phase detector means, jointly forming a synchronizing device according to the first aspect of the present invention, are made automatically operable and additionally provided is means operable by said phase adjuster and detector means to automatically feed the tool into stock. According to this second aspect, the phase adjuster 35 and phase detector 36, shown in FIGS. 1 and 2, serve as automatic phase adjuster A and automatic phase detector 140, respectively.

The second aspect of the invention will now be described with reference to FIG. 7, in which the same references have been used as in FIG. 6 for similar parts, the description on which will be omitted or made briefly only to such an extent as required for the understanding of the invention.

Figure 7:
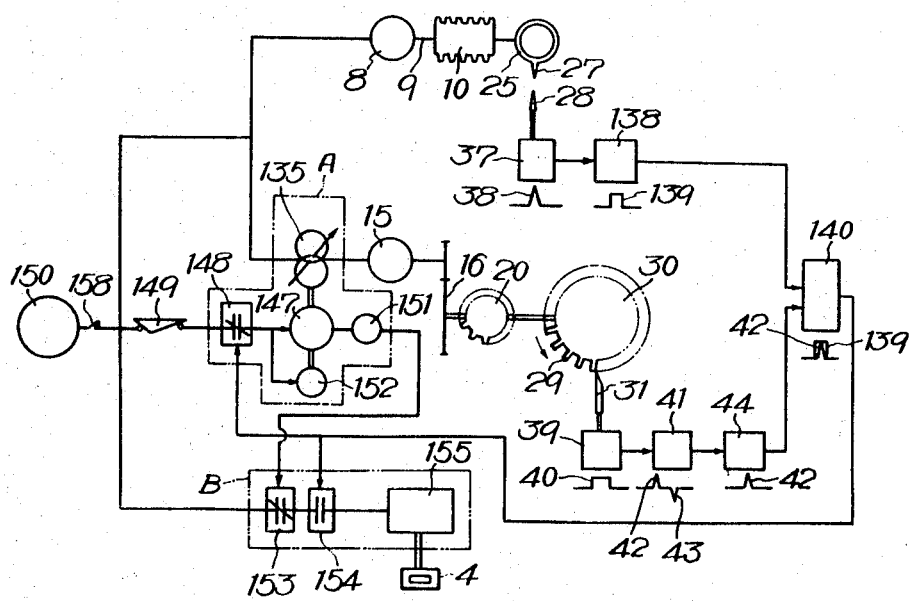
FIG. 7 is a schematic diagram illustrating the second aspect of the present invention.

Referring to FIG. 7, the automatic phase adjuster A essentially comprises a phase shifter 135 associated with synchronous motor 15 or 8 and a drive motor 147 therefor, which will be described later. Also, a square-wave converter 138 is provided to transform sharp pulse 38, having a peak value at the instant when memory pointers 27 and 28 coinside wtih each other, into a square wave 139, which is applied to automatic in-phase detector 140. Such wave transformation is employed to give some allowance to the in-phase range of the tool 10 and stock 20. The square-wave convertor 138 may take the form of an ordinary Schmitt circuit. It will be observed that automatic phase detector 140 is also fed with sharp pulse 42 through the rectifier circuit 44 and is operable to generate a signal when the sharp pulse 42 coincides with the square wave 139.

The motor 147 for driving the phase shifter 135 of automatic phase adjustor A is connected with a D.C. power source 150 by way of a normally closed relay 148 and a limit switch 149 and is directly connected with a generator 151. Accordingly, upon energization of motor 147, phase shifter 135 is operated while at the same time a signal is sent from generator 151 to the normally closed relay 153 to open it. Also, when the normally closed relay 148 opens upon reception of a signal from said automatic phase detector 140, the motor 147 with phase shifter 135 is rapidly brought to stop by brake means 152 and the signal from the generator 151 terminates to close the normally closed relay 153.

The automatic feed means B is comprised of a normally closed relay 153, a normally open relay 154, and a solenoid 155, which is connected to the power source 150 by way of these relays. The normally closed relay 153 opens upon reception of the signal from generator 151 while the normally open relay 154 opens upon reception of the signal from automatic phase detector 140. The soleniod 155 is employed to operate the switching device 4 for the oil hydraulic mechanism 3, which is operable to feed the tool carriage 5.

The use and operation of the arrangement illustrated in FIG. 7 will next be described.

First, as described hereinbefore, the memory or register pointers 27 and 31 are manually set in respective appropriate registering positions while the tool 10 and stock 20 are at rest in accurate intermeshing relationship. After completion of the registering operation, tool 10 is manually retracted out of meshing engagement with stock 20 and limit switch 149 as well as power source switch 158 is closed to drive synchronous motors 8 and 15 and also phase shifter 135. The automatic phase detector 140 is now fed concurrently with square wave 139 and sharp pulse 144, as pointed out hereinbefore. A certain phase difference initially appearing between the two pulses on the phase detector 140 because of a number of factors including the backlash in the transmission 9 and speed reduction gear 16 and the coupling error of the clutch will be controlled by the automatic phase adjuster A, which includes phase shifter 135, until the square wave 139 coincides with sharp pulse 42, when the phase detector generates a signal to close the normally open relay 154 while at the same time opening the normally closed relay 148 so that the motor 147 and phase shifter 135 are rapidly brought to a stop and the signal from generator 151 terminates to close the normally closed relay 153. Upon the closing both relays 153 and 154, the solenoid 155 in the automatic feed means B actuates the switching device 4 in a direction such that the hydraulic mechanism 3 operates automatically to advance the tool carriage 5 until it abuts against an adjustable stop 157 (FIG. 2) causing the tool to start grinding the stock 20. At the same time, the limit switch 149 is automatically opened. Thereafter, the tool 10 and stock 20 are driven by synchronous motors 8 and 15 to continue rotation in synchronism with each other. Upon completion of the grinding operation, power source switch 158 is opened and the tool 10 and stock 20 come to stop. At the same time, the switching device 4 is restored to its initial position and tool carriage 5 is retracted, thus returning the entire apparatus to its initial condition.

With this arrangement, it will be apparent from the foregoing description that the grinding operation can be automatically started with the tool 10 and stock 20 placed in accurate intermeshing phase relationship with each other, simply by registering the angular positions of the tool 10 and stock 20 about their respective axes of rotation by manual operation while they are held stationary meshing with each other and subsequently starting their idle rotation. This apparently forms an important advantage when viewed from the standpoint of production.

The use of a square-wave pulse 139 is for the purpose of giving some allowance or width to the range in which the sharp pulse 42 coincides therewith and thereby maintaining the signal from detector means 40 to further ensure the proper operation of those elements receiving such signal. It is to be understood, however, that any substantial width of the square wave 139 naturally would result in some phase error between the intermeshing tool and stock. Therefore, the width of the square wave should be limited so that the phase error is within limits allowable to the finishing requirement of the gear stock. The purpose of providing a normally open relay 154 is to prevent the solenoid 155 from being operated with some phase difference due to delay in time from the operation of the normally closed relay 145 to that of the normally closed relay 153 remaining uneliminated. Since the normally open relay 154 is opened whenever the square wave 139 and sharp pulse 42 are placed out of phase with respect to each other during such delay time, the solenoid 155 will not operate even when the normally closed relay 153 is closed.

According to the third aspect of the present invention, the phase adjuster and detector means forming the first aspect of the invention are made automatically operable and driving control means is provided which is operable by the automatic phase angle detector to drive the automatic phase adjuster in forward or reverse direction or to cause it to stop, thereby to correct the phase relationship between the intermeshing tool 10 and stock 20 and hold them in phase with each other during operation. By this means, it will be appreciated that gear grinding operation can be performed automatically with excellent results. The fourth aspect of the invention is additionally to provide automatic feed means. These aspects will next be described with reference to FIG. 8, in which the same references have been used as in FIG. 7 for similar parts, the description on which will be omitted or made briefly only to such an extent as required for the understanding of the invention.

Referring to FIG. 8, which includes an automatic phase adjuster means A constructed as described hereinbefore and an automatic phase angle detector means F comprised essentially of three phase angle detector units provided for synchronized operation of the tool 10 and stock 20, that is, an in-phase detector 140, a lagging-phase detector 237 and a leading-phase detector 238. The sharp pulse 38 generated by the memory pointer 28 for the tool 10 is transformed by a differentiation and rectification circuit 243 into a sharper pulse 244, which is fed into the leading-phase detector 238, and also into a square-wave generator 245 to be transformed into a square wave 246, which in turn is applied to the lagging-phase detector 237. The square wave 246 extends to the leading side of the in-phase position relative to the pulse 42. The square-wave generator may conveniently take the form of an ordinary one-shot multivibrator.

The pulse 42 from the memory pointer 31 for stock 20 is impressed upon both in-phase detector 140 and logging-phase detector 237 and also upon a square-wave generator 251, which transforms the pulse 42 into a square-wave pulse 252, to be fed into leading-phase detector 238. The square wave 252 extends, like the square wave 246, to the leading side of the in-phase position relative to the pulse 244. The square-wave generator 251 may also conveniently take the form of an ordinary one-shot multi-vibrator. Reference numeral 49 indicates a differentiation and rectification circuit serving the functions of both differentiation circuit 41 and rectifier circuit 44.

As described above, the detectors 140, 237 and 238 are each fed with two forms of pulse and generate a signal when the two pulses are coincident with or separated from each other. The phase relationship between the pulses will be described below with reference to FIG. 9.

In FIG. 9A, two forms of pulse applied to each of the detectors 140, 237 and 238 are coincident with each other. In this in-phase condition, the in-phase detector 140 sends out a signal but the lagging- and leading-phase detectors 237 and 238 send no signal. On the other hand, if the gear stock 20 lags slightly in phase relative to tool 10, the pulses 42, 42, 252 (indicated by the dotted lines) which show the phase angle of stock 20, lag behind the respective pulses 139, 246, 244 (indicated by the solid lines) corresponding to the phase angle of tool 10, as shown in FIG. 9B. One of the pulses 246 is separated from pulse 42 as shown and a signal is sent out from lagging-phase detector 237. However, since pulses 42, 139 as well as pulses 244, 252 remain overlapping or coincident with each other, the in-phase detector 140 transmits a signal, but no signal is sent from leading-phase detector 238. If the stock 20 lags further in phase, pulses 42 and 139 will be separated from each other, as shown in FIG. 9C, to terminate the signal from the in-phase detector 140, the other two detectors remaining in the same state as in FIG. 9B. Contrariwise, if the stock 20 leads in phase relative to the tool 10, initially pulses 244 and 252 are separated, as shown in FIG. 9D causing the leading-phase detector 238 to send out a signal. Subsequently, if the lead in phase of stock 20 increases, the pulses 42 and 139 are separated to terminate the signal from the in-phase detector 140. Up to this time, no signal is transmitted from the lagging-phase detector 237 since pulses 42 and 146 are overlapping.

Referring to FIG. 8, the drive motor 147 for the phase shifter 135 of the automatic phase adjuster A is connected to the forward and reverse terminals 254 and 255 of the driving control unit C, to which terminals are connected respective normally open relays 256 and 257, connected to a normally closed relay 258. Reference numeral 259 indicates a normally open self-holding relay of a relay unit D provided for initial forward rotation and the relay 259 is connected to said normally closed relay 258 and by way of a switch 260 of a delay operator E to a D.C. power source 261. An A.C. power source 262 is provided for synchronous motors 8 and 15 and includes a main switch 263 therefor. The input side of the said forward terminal 254 is connected to switch 260 by way of a normally closed self-holding relay 264 of the relay device D for initial forward rotation. It is to be noted that the self-holding relays 259, 264 and normally closed relay 258 are operated by the signal from the in-phase detector 140 while normally open relays 256 and 257 are operated by the signals from the leading- and lagging-phase detectors 238 and 237, respectively.

As described hereinbefore, generator 151 is directly connected with the motor 147 for phase shifter 135 so that upon operation of the latter the generator 151 sends out a signal to the normally closed relay 153. Reference numeral 66 indicates an automatic brake.

The automatic feed means B is comprised of normally closed relay 153, normally open relay 154 and solenoid 155, which is connected to the D.C. power source 261 by way of the relays 153, 154 and operates in the manner described hereinbefore.

Description will now be made on the use and operation of the arrangement shown in FIG. 8.

First, as described before, memory pointers 27 and 31 are manually set in proper registering positions, respectively, with the abrasive wheel 10 and gear stock 20 held at rest in accurate intermeshing engagement. After completion of the registering operation, tool 10 is manually retracted out of engagement with stock 20. Subsequently, main switch 263 is closed to start synchronous motors 8 and 15 to drive tool 10 and stock 20. By doing this, automatic phase angle detector F is also operated and, when the tool 10 and stock 20 have obtained respective substantially constant speeds of rotation, the switch 260 of the delay operator E is closed. Initially, however, since there occurs a considerable phase difference between tool 10 and stock 20 because of a number of factors including the backlash in the transmission 9 and speed reduction gear 16 and the coupling error of the clutch, the in-phase detector 140 remains inoperative, no signal being transmitted therefrom. Accordingly, upon the closing of switch 260, the forward terminal 254 is connected to D.C. power source 261 by way of the normally closed self-holding relay 264 to drive motor 147 and phase shifter 135 in a forward direction. Subsequently, when the tool 10 and stock 20 come in phase with each other, the in-phase detector 140 sends out a signal, which opens the normally closed self-holding relay 264 so that the motor 147 and phase shifter 135 are rapidly brought to stop.

Initially, at the start of forward rotation of motor 147, the normally closed relay 153 of the automatic feed unit B receiving the signal from generator 151 opens, the normally open relay 154 remaining in its normal or open position. However, when relay 154 is closed upon reception of the signal from in-phase detector 140 and the normally closed relay 153 restored upon stoppage of generator 151 to energize the solenoid 155, the switching device 4 is actuated to operate the oil hydraulic mechanism 3 in a direction such that the tool carriage 5 is automatically advanced until it engages adjustable stop 157 (FIG. 2) to cause the tool 10 to start grinding the stock 20, now accurately meshing with the tool.

At the same time when the normally closed self-holding relay 264 of the relay unit D for initial forward rotation is opened receiving the signal from the in-phase detector 140, the normally open self-holding relay 259 receiving the same signal is closed. These relays subsequently hold themselves until the main switch 263 is opened. Even after the closing of the normally open relay 259, since the normally closed relay 258 is held open receiving the signal from the in-phase detector 140 with the normally open relays 256 and 257 remaining in their normal open position with no triggering signal fed thereto, as long as the tool 10 and stock 20 are in phase with each other (as shown in FIG. 9A), the phase shifter 135 remains at rest and the stock is continuingly worked. However, if for some reason or other a phase difference takes place between the tool 10 and stock 20 and the automatic phase angle detector F assumes the state of FIG. 9B or 9D, one of the normally open relays 265 or 257 is closed. Further, when the phase difference increases until the automatic phase angle detector F assumes the state of FIG. 9C or 9D, the normally closed relay 258 is also closed to connect one of the terminals 254 and 255 to the D.C. power source 61 and phase shifter 135 is again started. At the same time, one or both of the relays 153 and 154 are opened so that the solenoid 155 is actuated in opposite direction to disengage the tool 10 from the stock 20. When the tool 10 and stock 20 are again placed in phase with each other by operation of the phase shifter 135, the latter comes to rest and the tool 10 is again placed into engagement with stock 20 in proper phase relationship therewith to resume working. It will be apparent that each time when a gear stock 20 has been completely ground, the main switch 263 is opened and the entire machine is restored to its initial state.

With this arrangement, it will be appreciated from the foregoing that, since any phase difference occurring in operation between the tool 10 and stock 20 is effectively eliminated in an automatic fashion to maintain them in phase with each other, the grinding accuracy can be maintained throughout the cycle of machine operation. In addition, since not only the phase correction and the maintenance of such corrected phase relation between the tool 10 and stock 20 but also the feed-in operation to place them in meshing engagement with each other while maintaining them in phase are automatically effected, the attendence required is materially reduced while maintaining the high accuracy of the finished product.

In the above-described embodiments, the memory plate 30 is formed with memory lugs 29 the number of which corresponds to that of the teeth of gear stock 20 or its fraction. However, the manufacture of such memory plate is very difficult since the memory lugs 29 must be spaced with extreme accuracy to maintain the desired accuracy of the product gear. Moreover, since the memory lugs must correspond in number to the teeth of the gear stock 20, as pointed out above, stocks having different numbers of teeth require different memory plates and this means increased labor and time requirement on the operator's side. A further deficiency of such memory plate 30 comes from the fact that since the mandrel 19, on which the memory plate is mounted, is driven at relatively low speed, the linear speed of the memory lugs 29 on the plate is also limited so that the square wave 40 produced by such memory lug cannot be satisfactorily sharp and definite.

To overcome these deficiencies, the fifth aspect of the present invention includes use of a memory plate having a single memory lug 29 formed thereon and avoids the difficulties involved in the use of such memory plate in an ingenious manner.

A further form of gear grinding machine according to the first aspect of the present invention, which is modified by incorporating the fifth aspect of the invention, will next be described with reference to FIGS. 10 to 15, in which the same reference numerals have been used as in FIGS. 1 to 6 for similar parts, the description on which will be omitted or made briefly only to such an extent as required for the understanding of the invention. It will be apparent to those skilled in the art that the fifth aspect can also be incorporated in machines embodying the second, third and fourth aspects of the invention.

Referring to FIGS. 10 to 15, memory plate 30 is formed with a single memory lug 327. As specifically shown in FIG. 13, a memory or register pointer 334 is fixed to the rotor shaft 333 of synchronous motor 15 for driving stock 20. A cooperating memory pointer 335 is adjustably secured to an adjacent portion of the vertical slide 11 which is located radially outward of the memory pointer 334 with respect to the axis of the rotor shaft 333. The memory pointer 335 is carried on a slide block 336 which is slidably mounted in an arcuate guide groove 336, which is formed concentrically with the rotor shaft 333 in a bracket upstanding from the top of slide 11 (FIGS. 10 and 13). As shown in FIG. 14, a loader device such as a gear pump 337, or a hand brake, not shown, is provided in a position as close as possible to the stock 20, for example, on the stock drive shaft 14, for the purpose of suitably loading the latter at a point in the proximity of the stock 20. Reference numeral 347 indicates a switch for selectively connecting the phase angle detector or two-phenomenon synchroscope 36 with FM capacitive displacement pickup 37 and also, with differentiation and rectification circuit 49. A throttle valve 349 is provided for the gear pump 337 as a loader device to control its loading effect. In FIG. 10 the tool spindle 7 is shown directly connected with the rotor shaft of synchronous motor 8 with no transmission mechanism like that indicated at 9 in FIG. 1 arranged therebetween, nevertheless the same functional effect is achieved.

The use and operation of the arrangement shown in FIGS. 10 to 15 will next be described.

First, the memory pointers 27 and 31 are set in their respective registering positions while the abrasive wheel 10 and stock 20 are at rest in an accurate intermeshing relation and then they are disengaged from each other. Subsequently, the synchronous motor 15 is started to drive the gear stock 20 and parts associated therewith, and simultaneously switch 347 is operated to connect the differentiation and rectification circuit 49 to synchroscope 36. On the synchroscope 36 appear a pulse 344 formed by the memory pointer 335 and displacement pickup 343 and another pulse 42 from memory pointer 31. At this point, the memory pointer 335 is adjusted in position until pulses 344 and 42 coincide and fixed in the adjusted position. It will be noted that the angular position of rotor shaft 333 now represents that of stock 20 and is registered as such. Subsequently, switch 347 is shifted so that a pulse 38 from the tool 10 appears on the synchroscope. The pulse 38 is controlled so as to remain in phase with pulse 344 thereby to enable accurate gear grinding operation.

Though the use of a memory plate 30 having a single memory lug 327 has advantages as described hereinbefore, the time interval between two successive pulses formed by such memory plate is relatively large since the memory plate rotating at slow speed only produces one pulse for each revolution. Such relatively large pulse interval would make it practically impossible to control phase variation during the interval and result in products of inferior grinding accuracy. It is to be noted that this difficulty can be avoided by use of the memory pointer 334 arranged on the rotor shaft 333, which rotates at high speed, in place of the memory lug 327 on the memory plate rotating at low speed, as described above. It is also to be noted that any adverse effect upon the phase relationship of the backlash in the speed reduction gear 16 can be effectively avoided by use of loader device 337.

Although several embodimentso of the present invention have been illustrated and described, it will be apparent to those skilled in the art that various changes and modifications may be made therein without departing from the spirit of the invention or from the scope of the appended claims.

What is claimed is:

1. A gear grinding machine comprising two synchronous motors for rotating a hob-type helical abrasive wheel and a roughly shaped gear stock to be ground thereby in synchronized phase relationship with each other, memory means for registering definite angular positions of the abrasive wheel and the gear stock about their respective axes of rotation when they are at rest in an intermeshing relationship with each other, means for adjusting the phase relationship between the abrasive wheel and the gear stock in their synchronized rotation by regulating the phase of at least one of said synchronous motors, and phase angle detector means for detecting the phase relationship between the rotating abrasive wheel and gear stock as in their respective registered positions through the intermediary of said memory means.

2. A gear grinding machine comprising two synchronous motors for rotating a hob-type helical abrasive wheel and a roughly shaped gear stock to be ground thereby in synchronized phase relationship with each other, memory means for registering definite angular positions of the abrasive wheel and the gear stock about their respective axes of rotation when they are at rest in an intermeshing relationship with each other, automatic phase adjuster means for automatically adjusting the phase relationship between the abrasive wheel and gear stock in their synchronized rotation by regulating the phase of at least one of said synchronous motors, automatic phase detector means for automatically detecting the arrival of the rotating abrasive wheel and gear stock in their respective registered angular positions through the intermediary of said memory means, and automatic feed means operable by said automatic phase detector means to automatically feed the abrasive wheel into the gear stock.

3. A gear grinding machine comprising two synchronous motors for rotating a hob-type helical abrasive wheel and a roughly shaped gear stock to be ground thereby in synchronized phase relationship with each other, memory means for registering definite angular positions of the abrasive wheel and the gear stock about their respective axes of rotation when they are at rest in an intermeshing relationship with each other, automatic phase adjuster means for automatically adjusting the phase relationship between the abrasive wheel and the gear stock in their synchronized rotation by regulating the phase of at least one of said synchronous motors, automatic phase angle detector means for automatically detecting the in-phase and out-of-phase relationships between the abrasive wheel and the gear stock through the intermediary of said memory means, and driving control means automatically operable by said automatic phase angle detector means to drive said automatic phase adjuster means in opposite directions and stop said automatic phase adjuster means.

4. A gear grinding machine comprising two synchronous motors for rotating a hob-type helical abrasive wheel and a roughly shaped gear stock to be ground thereby in synchronized phase relationship with each other, memory means for registering definite angular positions of the abrasive wheel and the gear stock about their respective axes of rotation when they are at rest in an intermeshing relationship with each other, automatic phase adjuster means for automatically adjusting the phase relationship between the abrasive wheel and the gear stock in their synchronized rotation by regulating the phase of at least one of said synchronous motors, automatic phase angle detector means for automatically detecting the in-phase and out-of-phase relationships between the rotating abrasive wheel and gear stock through the intermediary of said memory means, driving control means automatically operable by said automatic phase angle detector means to drive said automatic phase adjuster means in opposite directions and stop said automatic phase adjuster means, and automatic feed means operable by said automatic phase angle detector means to automatically feed the abrasive wheel into the gear stock when the abrasive wheel and gear stock are in phase with each other.

5. A gear grinding machine as claimed in claim 1 comprising a speed reduction gear between the gear stock and the synchronous drive motor and adjustable load means between the speed reduction gear and the stock for applying load to the last mentioned synchronous drive motor to prevent backlash in the speed reduction gear.

References Cited

UNITED STATES PATENTS

| | | | |
|---|---|---|---|
| 2,399,421 | 4/1946 | Artzt | 318—314 X |
| 2,496,103 | 1/1950 | Neufeld | 318—318 X |
| 2,769,949 | 11/1956 | Stratton | 318—314 X |
| 3,152,422 | 10/1964 | Loxham | 51—95 X |

ROBERT C. RIORDON, *Primary Examiner.*

D. G. KELLY, *Assistant Examiner.*

U.S. Cl. X.R.

51—95, 165